United States Patent Office 3,808,197
Patented Apr. 30, 1974

3,808,197
RUTIN-COMPLEXES AND PROCESS FOR THE PREPARATION THEREOF
Laszlo Feuer, Lorant Farkas, Mihaly Nogradi, Janos Streliszky, and Janos Bodnar, Budapest, Hungary, assignors to Chinoin Gyogyszer-es Vegyeszeti Termekek Gyara RT, Budapest, Hungary
No Drawing. Filed Jan. 14, 1972, Ser. No. 217,971
Claims priority, application Hungary, Jan. 18, 1971, CI-1,076
Int. Cl. C07c 47/18
U.S. Cl. 260—210 F
6 Claims

ABSTRACT OF THE DISCLOSURE

The invention relates to compounds of formula

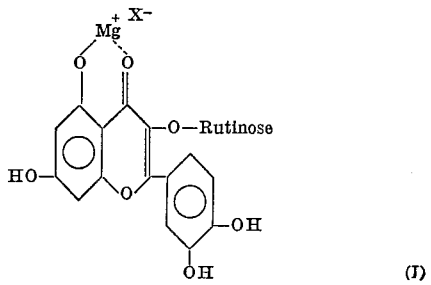

wherein $X^-$ is an organic anion, preferably an aliphatic carboxylic acid.

The process for the production of compounds of Formula I involves reacting rutin with an organic magnesium salt in the presence of an organic solvent.

(1) FIELD OF THE INVENTION

This invention is directed to new rutin-complexes, a process for the preparation thereof and pharmaceutical compositions comprising same. More particularly it is concerned with new metal complexes of magnesium.

(2) BACKGROUND OF THE INVENTION

It is known, that quercetin and its derivatives reduce the cholesterol level of blood. An effect on decrease of cholesterol level in blood has been demonstrated on rabbits when administering vitamin P active substances under foddering of cholesterol (Fragen d. Ernährung Moskau 17, 34, 1958).

Under simultaneous administration of cholesterol and quercetine the alphalypoprotein and the cholesterol level of blood decreases (Arch. Ital. Sci. Farmacol. 7, 29, 1957).

It is further known, that a decrease of Guerin-tumor has been reached by administration of magnesium-flavin complexes. These complexes are effective against hypercholesterinemia, arteriosclerosis and various tissue-damages (Therapie, 16, 70, 1961).

It has been found according to the present invention, that rutin-magnesium complexes having the General Formula I

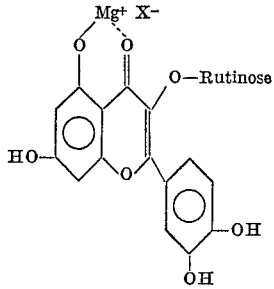

(wherein $X^-$ is an organic anion) decrease significantly the cholesterol level of blood and inhibit the deposition of cholesterol on vein walls. These complexes decrease considerably the serum-cholesterol level, the lyphoid-, glyceride and cholesterol-content of liver. These compounds inhibit the arothrombine time shortening and platelet-number increasing effect of cholesterol. The compounds are practically nontoxic even if administered in high doses.

(3) DESCRIPTION OF THE INVENTION

The present invention presents compounds of Formula I (wherein $X^-$ represents an organic anion). The preparation which comprises reacting rutin with an organic magnesium salt is also presented.

The term "organic anion" represents preferably a radical of an aliphatic carboxylic acid, particularly that of a lower aliphatic acid having 1–4 carbon atoms, particularly that of acetic acid.

The reaction is carried out preferably in the presence of an organic solvent. For this purpose preferably lower aliphatic alcohols such as methanol or ethanol may be used. The starting materials are preferably used in equimolar amounts. A particularly preferable compound of the present invention is rutin-magnesium-acetate.

The present invention also presents pharmaceutical compositions comprising as active ingredient at least one new rutin-magnesium-complex of Formula I in admixture with suitable inert organic or inorganic carriers or diluents. The pharmaceutical compositions may be finished in solid (tablets, pills, coated pills, powder mixtures etc.) or liquid (e.g. solution, suspensions or injectable preparations) form. The pharmaceutical compositions may contain further additives such as sliding agents, filling agents, etc. As carrier, e.g., talc, calcium carbonate, magnesium stearate, water, etc. may be used, but any other usual pharmaceutical carriers and additives may be applied as well. The preparation of the pharmaceutical compositions is carried out according to methods of pharmaceutical industry known per se.

The advantage of the invention resides in the fact that pharmaceutically valuable new compounds are obtained in high yields.

Further details of our process are to be found in the example without limiting the scope of the present invention to the example.

EXAMPLE 1.75 g. of rutin, meeting the requirements of pharmacopoiea, are dissolved under boiling in 500 ml. methanol. The pH-value of the solution is adjusted to 8–8.5 by adding ammonium hydroxide under nitrogen. A solution of 6.14 g. magnesium acetate tetrahydrate and 150 ml. of methanol are added dropwise to the reaction mixture which is stirred at 45–50° C. The precipitation of a yellow crystalline product begins immediately. The precipitated yellow powdering crystals are filtered under nitrogen-current and washed with warm methanol and then with ether. The mother-lye is evaporated to dryness in vacuo. Thus 16.84 g. of yellow rutin-magnesium-acetate-trihydrate are obtained. Yield: 84.1%. The product slowly decomposes at 250–300° C.

The structure of the compound is verified by spectrophotometrical, microanalytical, gaschromatographical and complexometrical methods. The magnesium-ion attaches in complex-binding to the carbonyl-group in position 4 and to the hydroxide group in position 5.

The biological activity of the rutin-magnesium acetate (A) is illustrated by a number of test results.

The effect on the cholesterol-level of blood was tested on 30 rabbits weighing 1800–2800 g. each. The rabbits were kept on a cholesterol-diet for 45 days being fed 1 g. of cholesterol per day. One group of the animals was treated with 100 mg. tester-compound A/body weight, and the other group represented the control. The results are given as mean values and summarized in Table I:

TABLE I

| | Cholesterol/ mg., percent before treatment with (A) | Cholesterol/mg., percent after treatment with (A) | | | |
|---|---|---|---|---|---|
| | | 15 days | 29 days | 39 days | 45 days |
| Treated rabbits | 125.5 | 1,079 | 1,226 | 1,375 | 1,559 |
| Control | 145.1 | 1,297 | 1,988 | 2,024 | 2,276 |

The above data show that on administration of compound A in the cholesterol level of rabbits decreases in a significant extent.

Further experiments were carried out on four groups containing 10 rabbits each. The first group was the normal group which received 0.5 ml. of physiological sodium chloride solution/body weight; the other three groups were kept on a cholesterol diet (1 g./day) for 36 days. The second group is the control. The third group was treated with 100 mg. compound A/body weight intramuscularly and the fourth group with 40 mg. of magnesium asparginate/body weight (magnesium-percentage was equivalent with A) for the sake of comparison. The results are summarized in Table II.

TABLE II

| Group | Percent serum cholesterol values (mg.) | Pro-thrombine time, sec. | Thrombine time, sec. | Platelet number |
|---|---|---|---|---|
| Normal | 147±42 | 114±27 | 34±2.6 | 406±11 |
| Control | 1,623±196 | 62±19 | 25.7±3.1 | 516±22 |
| Compound A | 1,154±156 | 88±21 | 29.4±3.2 | 433±23 |
| Magnesium asparginate | 1,480±168 | 74±16 | 25.0±3 | 468±20 |

It appears from the above data that when administering compound A in the course of a 36 day cholesterol diet the cholesterol level of blood decreased to an outstandingly low value and the thrombine+time was shortened by not more than 15–20% in comparison to the normal value. Compound A inhibits the prothrombine-time shortening effect of cholesterol and it inhibits the increase of platelet number. These effects are observed to greater extent with compound A than with any of the other test compounds. The thrombine activating values are practically identical with the normal values.

Another experiment was carried out on 120 white male rats weighing 100–150 g. each. The first group was the normal group, treated with 0.5 ml. of physiological sodium chloride solution/body weight. The other two groups were kept on a vasopathogenic diet and on an intensive Hartfort diet complexed with sodium chloride and vitamin D; one of these two groups was treated with 100 mg. compound A/body weight. The results are summarized in Table III.

TABLE III

| Group | Percent cholesterol level (mg.) after— | | |
|---|---|---|---|
| | 8 days | 21 days | 36 days |
| Normal | 93±14 | 88±17 | 97±11 |
| Control | 235±32 | 227±26 | 174±38 |
| A | 149±41 | 221±31 | 138±29 |

Compound A proved to be significantly active considerably decreasing the damages caused by the diet.

Toxicity data of compound A are the following:

$LD_{50}$:
   P.o. _____ g./body weight __ 14
$LD_{50}$:
   Intravenously _____ mg./body weight __ 900

What we claim is:
1. A rutin-magnesium complex having the formula:

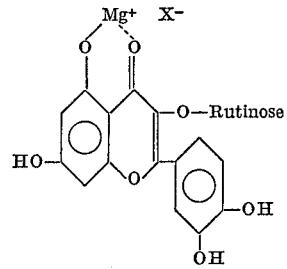

wherein $X^-$ is an anion of a lower aliphatic carboxylic acid having 1 to 4 carbon atoms.

2. The complex defined in claim 1, wherein $X^-$ is acetyl.

3. A process for the preparation of a rutin-magnesium complex having the formula:

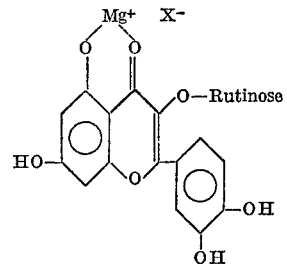

wherein $X^-$ is an anion of a lower aliphatic carboxylic acid having 1 to 4 carbon atoms, which comprises reacting rutin with the magnesium salt of said acid under an inert gas.

4. The process defined in claim 3 wherein said magnesium salt is magnesium acetate.

5. The process defined in claim 4 wherein the rutin and magnesium salt are reacted in equimolar amounts in an organic solvent.

6. A process for producing a rutin-magnesium complex of the formula

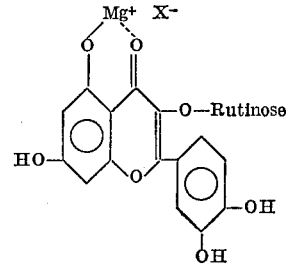

wherein $X^-$ is the anion of an aliphatic carboxylic acid mixing at 1 to 4 carbon atoms comprising the steps of reacting a magnesium salt of said acid and rutin under nitrogen in substantially equally molar amounts in an organic solvent selected from the group which consists of methanol and ethanol.

References Cited

UNITED STATES PATENTS

| | | | |
|---|---|---|---|
| 2,534,250 | 12/1950 | De Eds et al. | 260—210 F |
| 3,157,584 | 11/1964 | Pouchet | 260—210 F |
| 3,637,655 | 1/1972 | Clendenning | 260—210 F |

JOHNNIE R. BROWN, Primary Examiner

U.S. Cl. X.R.

424—180